US011113146B2

(12) United States Patent
Danilov et al.

(10) Patent No.: US 11,113,146 B2
(45) Date of Patent: *Sep. 7, 2021

(54) CHUNK SEGMENT RECOVERY VIA HIERARCHICAL ERASURE CODING IN A GEOGRAPHICALLY DIVERSE DATA STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/399,895

(22) Filed: Apr. 30, 2019

(65) Prior Publication Data

US 2020/0349002 A1 Nov. 5, 2020

(51) Int. Cl.
| G06F 11/10 | (2006.01) |
| G06F 11/00 | (2006.01) |
| G06F 3/00 | (2006.01) |
| G06F 3/06 | (2006.01) |

(52) U.S. Cl.
CPC .......... *G06F 11/1076* (2013.01); *G06F 3/067* (2013.01); *G06F 3/0619* (2013.01); *G06F 3/0659* (2013.01)

(58) Field of Classification Search
None
See application file for complete search history.

(56) References Cited

U.S. PATENT DOCUMENTS

| 5,675,802 | A | 10/1997 | Allen et al. |
| 5,805,788 | A | 9/1998 | Johnson |
| 5,950,225 | A | 9/1999 | Kleiman |
| 6,502,243 | B1 | 12/2002 | Thomas |
| 7,389,393 | B1 | 6/2008 | Karr et al. |
| 7,577,091 | B2 | 8/2009 | Antal et al. |
| 7,631,051 | B1 | 12/2009 | Fein et al. |
| 7,664,839 | B1 | 2/2010 | Karr et al. |
| 7,680,875 | B1 | 3/2010 | Shopiro et al. |

(Continued)

OTHER PUBLICATIONS

Non-Final Office Action received for U.S. Appl. No. 15/794,950 dated Jul. 9, 2019, 29 pages.

(Continued)

*Primary Examiner* — Justin R Knapp
(74) *Attorney, Agent, or Firm* — Amin, Turocy & Watson, LLP

(57) ABSTRACT

Recovery of chunk segments stored via hierarchical erasure coding in a geographically diverse data storage system is disclosed. Chunks can be stored according to a first-level erasure coding scheme in zones of a geographically diverse data storage system. The chunks can then be further protected via one or more second-level erasure coding schema within a corresponding zone of the geographically diverse data storage system. In response to determining segment of a chunk has become less accessible, recover of the segment can be performed according to the hierarchical erasure coding scheme of relevant chunks at relevant zones of the geographically diverse data storage system.

20 Claims, 10 Drawing Sheets

(56) References Cited

U.S. PATENT DOCUMENTS

| | | |
|---|---|---|
| 7,721,044 B1 | 5/2010 | Chatterjee et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,540,625 B2 | 9/2013 | Miyoshi |
| 8,683,205 B2 | 3/2014 | Resch et al. |
| 8,751,599 B2 | 6/2014 | Tran et al. |
| 8,751,740 B1 | 6/2014 | De Forest et al. |
| 8,799,746 B2 | 8/2014 | Baker et al. |
| 8,832,234 B1 | 9/2014 | Brooker et al. |
| 8,856,619 B1* | 10/2014 | Cypher .............. G06F 11/1044 714/770 |
| 8,856,624 B1 | 10/2014 | Paniconi |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1* | 8/2015 | Donlan .............. H03M 13/1102 |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2* | 5/2017 | Vairavanathan .......... G06F 3/06 |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1* | 5/2019 | Danilov .................. H04L 69/40 |
| 10,331,516 B2* | 6/2019 | Danilov .................. G06F 3/064 |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2* | 3/2020 | Danilov .............. H03M 13/373 |
| 10,613,780 B1 | 4/2020 | Naeni et al. |
| 10,644,408 B2 | 5/2020 | Sakai et al. |
| 10,733,053 B1 | 8/2020 | Miller et al. |
| 10,797,863 B2 | 10/2020 | Chen et al. |
| 10,846,003 B2 | 11/2020 | Danilov et al. |
| 2002/0166026 A1 | 11/2002 | Ulrich et al. |
| 2002/0191311 A1 | 12/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Baker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1* | 12/2014 | Yekhanin .............. G06F 11/1076 714/766 |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |

(56) References Cited

U.S. PATENT DOCUMENTS

| | | | |
|---|---|---|---|
| 2016/0253400 | A1 | 9/2016 | McAlister et al. |
| 2016/0277497 | A1 | 9/2016 | Bannister et al. |
| 2016/0292429 | A1 | 9/2016 | Bannister et al. |
| 2016/0294419 | A1 | 10/2016 | Sandell et al. |
| 2016/0328295 | A1 | 11/2016 | Baptist et al. |
| 2016/0357443 | A1 | 12/2016 | Li et al. |
| 2016/0357649 | A1 | 12/2016 | Karrotu et al. |
| 2016/0371145 | A1 | 12/2016 | Akutsu et al. |
| 2016/0378624 | A1 | 12/2016 | Jenkins, Jr. et al. |
| 2016/0380650 | A1 | 12/2016 | Calder et al. |
| 2017/0003880 | A1 | 1/2017 | Fisher et al. |
| 2017/0004044 | A1 | 1/2017 | Tormasov et al. |
| 2017/0017671 | A1 | 1/2017 | Baptist et al. |
| 2017/0031945 | A1 | 2/2017 | Sarab et al. |
| 2017/0097875 | A1* | 4/2017 | Jess ............... G06F 11/1092 |
| 2017/0102993 | A1 | 4/2017 | Hu et al. |
| 2017/0116088 | A1 | 4/2017 | Anami et al. |
| 2017/0187398 | A1 | 6/2017 | Trusov |
| 2017/0187766 | A1 | 6/2017 | Zheng et al. |
| 2017/0206025 | A1 | 7/2017 | Viswanathan |
| 2017/0206135 | A1 | 7/2017 | Zeng |
| 2017/0212680 | A1 | 7/2017 | Waghulde |
| 2017/0212845 | A1 | 7/2017 | Conway |
| 2017/0235507 | A1 | 8/2017 | Sinha et al. |
| 2017/0262187 | A1 | 9/2017 | Manzanares et al. |
| 2017/0268900 | A1 | 9/2017 | Nicolaas et al. |
| 2017/0285952 | A1 | 10/2017 | Danilov et al. |
| 2017/0286009 | A1 | 10/2017 | Danilov et al. |
| 2017/0286436 | A1 | 10/2017 | Neporada et al. |
| 2017/0286516 | A1 | 10/2017 | Horowitz et al. |
| 2017/0288701 | A1 | 10/2017 | Slik et al. |
| 2017/0344285 | A1 | 11/2017 | Choi et al. |
| 2018/0052744 | A1 | 2/2018 | Chen et al. |
| 2018/0063213 | A1 | 3/2018 | Bevilacqua-Linn et al. |
| 2018/0074881 | A1 | 3/2018 | Burden |
| 2018/0121286 | A1 | 5/2018 | Sipos |
| 2018/0129417 | A1 | 5/2018 | Sivasubramanian et al. |
| 2018/0181324 | A1 | 6/2018 | Danilov et al. |
| 2018/0181475 | A1* | 6/2018 | Danilov ............ H03M 13/3761 |
| 2018/0181612 | A1 | 6/2018 | Danilov et al. |
| 2018/0246668 | A1 | 8/2018 | Sakashita et al. |
| 2018/0267856 | A1 | 9/2018 | Hayasaka et al. |
| 2018/0267985 | A1 | 9/2018 | Badey et al. |
| 2018/0306600 | A1 | 10/2018 | Nicolaas et al. |
| 2018/0307560 | A1 | 10/2018 | Vishnumolakala et al. |
| 2018/0341662 | A1 | 11/2018 | He |
| 2018/0375936 | A1 | 12/2018 | Chirammal et al. |
| 2019/0028179 | A1 | 1/2019 | Kalhan |
| 2019/0034084 | A1 | 1/2019 | Nagarajan et al. |
| 2019/0043201 | A1 | 2/2019 | Strong et al. |
| 2019/0043351 | A1 | 2/2019 | Yang et al. |
| 2019/0050301 | A1 | 2/2019 | Juniwal et al. |
| 2019/0065092 | A1 | 2/2019 | Shah et al. |
| 2019/0065310 | A1 | 2/2019 | Rozas |
| 2019/0114223 | A1 | 4/2019 | Pydipaty et al. |
| 2019/0205437 | A1 | 7/2019 | Larson et al. |
| 2019/0215017 | A1 | 7/2019 | Danilov et al. |
| 2019/0220207 | A1 | 7/2019 | Lingarajappa |
| 2019/0356416 | A1 | 11/2019 | Yanovsky et al. |
| 2019/0384500 | A1 | 12/2019 | Danilov et al. |
| 2019/0386683 | A1 | 12/2019 | Danilov et al. |
| 2020/0026810 | A1 | 1/2020 | Subramaniam et al. |
| 2020/0042178 | A1 | 2/2020 | Danilov et al. |
| 2020/0050510 | A1 | 2/2020 | Chien et al. |
| 2020/0104377 | A1 | 4/2020 | Earnesty, Jr. et al. |
| 2020/0117556 | A1 | 4/2020 | Zou et al. |

OTHER PUBLICATIONS

Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance dated May 4, 2020 for U.S. Appl. No. 16/240,193, 46 pages.
Office Action dated May 11, 2020 for U.S. Appl. No. 16/177,278, 53 pages.
Office Action dated May 8, 2020 for U.S. Appl. No. 16/231,018, 78 pages.
Notice of Allowance dated May 11, 2020 for U.S. Appl. No. 16/240,193, 24 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non- Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Office Action dated Jan. 9, 2020 for U.S. Appl. No. 16/010,255, 31 pages.
Office Action dated Feb. 5, 2020 for U.S. Appl. No. 16/261,551, 30 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.

(56) References Cited

OTHER PUBLICATIONS

Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Notice of Allowance received for U.S. Appl. No. 16/374,726 dated Jan. 6, 2021, 56 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x;" EMC; Jun. 2015; available at: https://www.dell. 3om/community/s/vjauj58549/attachments/vjauj58549/solutions-ch/477/1/h14071-ecs-architectural-guide-wp.pdf, Jun. 2015, 21 pages.
Mohan et al., "Geo-aware erasure coding for high-performance erasure-coded storage clusters", Springer Link, URL https://link.springer.com/article/10 1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 Pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Notice of Allowance dated Jun. 14, 2021 for U.S. Appl. No. 16/726,428, 34 pages.
Office Action dated May 24, 2021 for U.S. Appl. No. 16/698,096, 63 pages.
Office Action dated May 13, 2021 for U.S. Appl. No. 16/745,855, 72 pages.
Office Action dated Jun. 24, 2021 for U.S. Appl. No. 16/834,649, 61 pages.
Office Action dated May 12, 2021 for U.S. Appl. No. 16/179,486, 50 pages.
Office Action dated May 12, 2021 for U.S. Appl. No. 16/570,657, 79 pages.

* cited by examiner

CHUNK SEGMENT RECOVERY VIA HIERARCHICAL ERASURE CODING IN A GEOGRAPHICALLY DIVERSE DATA STORAGE SYSTEM

TECHNICAL FIELD

The disclosed subject matter relates to data recovery, more particularly, to recovering data of a segment of a data chunk, wherein the data is represented in another segment of another data chunk of another zone of a geographically diverse data storage system, and wherein the geographically diverse data storage system employs hierarchical erasure encoding technology.

BACKGROUND

Conventional data storage techniques can employ convolution and deconvolution of data to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage.

DETAILED DESCRIPTION

Figure 1:
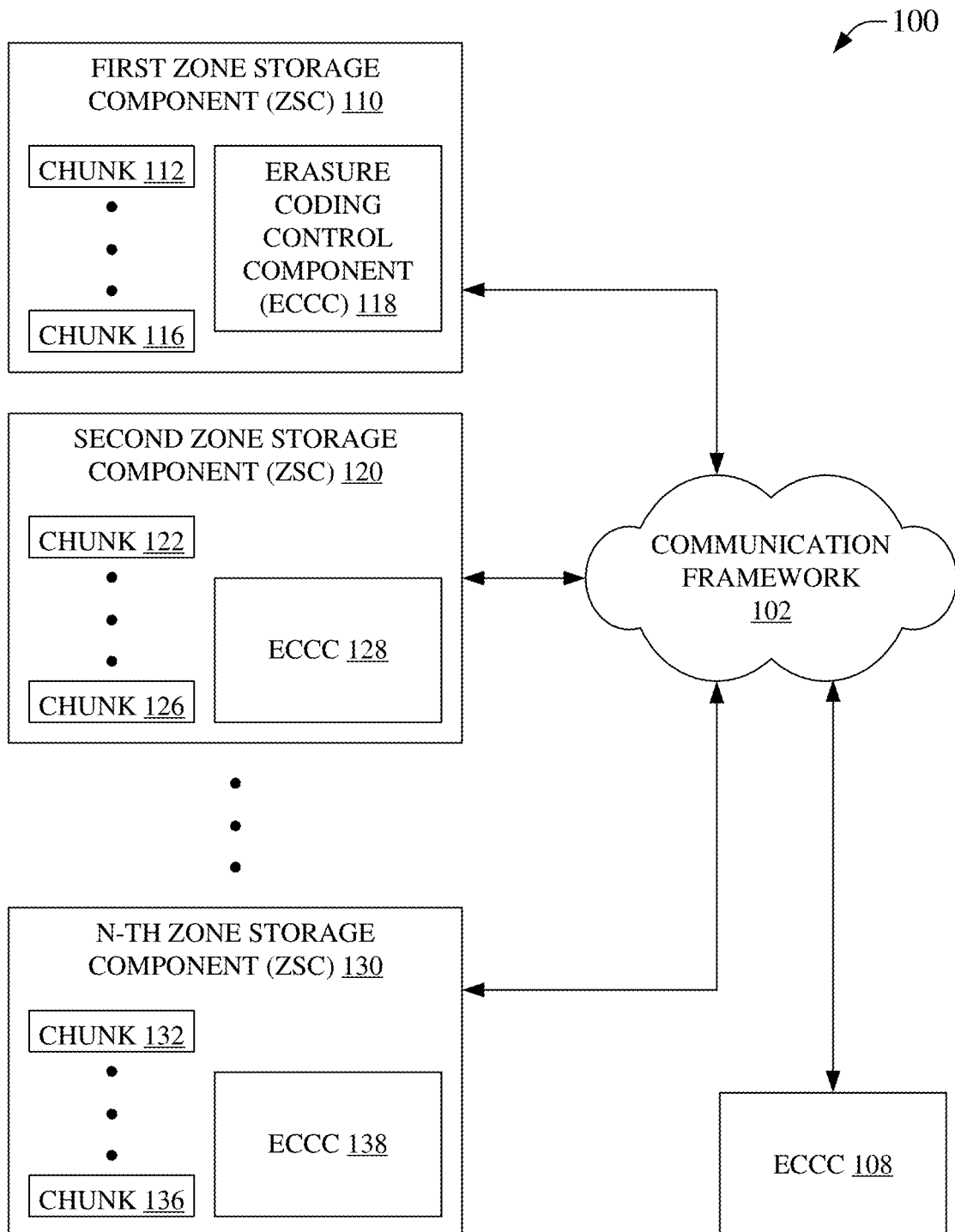
FIG. 1 is an illustration of an example system that can facilitate chunk segment recovery via hierarchical erasure coding in a geographically diverse data storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example ECS offered by Dell EMC, formerly known as Elastic Cloud Storage by Dell EMC. Bulk storage can, in an aspect, manage disk capacity via partitioning of disk space into blocks of fixed size, frequently referred to as data chunks, chunks, etc., for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk is determined to be 'full enough,' it can be sealed so that the data therein is generally not available for further modification, e.g., the chunk can designated as immutable. These chunks can be then stored in a geographically diverse manner to allow for recovery of the data where a first copy of the data is destroyed, e.g., disaster recovery, etc. Chunks from a data storage device, e.g., 'zone storage component' (ZSC), 'zone storage device' (ZSD), etc., located in a first geographic location, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

Geographically diverse data storage can use data compression to store data. As an example, a storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved in Denver, for example via an 'XOR' operation, into a different chunk, e.g., a convolved chunk, to allow recovery of the Seattle or San Jose data from the convolved chunk, but where the convolved chunk typically consumes less storage space in Denver than the sum of the storage space for both the Seattle and San Jose chunks individually in Denver. In an aspect, compression can comprise convolving data and decompression can comprise deconvolving data, hereinafter the terms compress, compression, convolve, convolving, etc., can be employed interchangeably unless explicitly or implicitly contraindicated, and similarly, decompress, decompression, deconvolve, deconvolving, etc., can be used interchangeably unless explicitly or implicitly contraindicated. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used at a geographically distinct location.

In an aspect, a first data chunk and a second data chunk corresponding to a first and second zone that are geographically diverse can be stored in a third data chunk stored at third zone that is geographically diverse from the first and second zones. Further, the third chunk can represent the data of the first and second data chunks in a compressed form, e.g., the data of the first data chunk and the second data chunk can be convolved, such as by an XOR function, into the third data chunk. In an aspect, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. In an aspect, where compression occurs without replicating a chunk at another zone prior to compression, this can be termed as 'on-arrival data compression' and can reduce the count of replicate data made at the third zone and data transfers events can correspondingly also be reduced. In an aspect, convolution can also be based on copies of the first and second chunks created at the third zone. In an aspect, a convolved chunk stored at a geographically diverse storage device can comprise data from some or all storage devices of a geographically diverse storage system. As an example, where there are six storage zones, a first storage device in a first zone can convolve chunks from the other five zones to create a 'backup' of the data from the other five storage zones. In this example, the first storage device can create a backup chunk from chunks received from the other five storage zone devices. In an embodiment, this can result in generating copies of the five received chunks at the first storage device and then convolving the five chunks to generate a sixth chunk that is a backup of the other five chunks. Moreover, one or more other copies of the five chunks can be created at the first storage device for further redundancy. In another example, the first storage device can convolve chunks from three of the other five storage devices, etc.

In an aspect, a ZSC can comprise one or more data storage components that can be communicatively coupled, e.g., a ZSC can comprise one data store, two or more communicatively coupled data stores, etc. In an aspect, this can allow replication of data in the ZSC and can provide data redundancy in the ZSC, for example, providing protection against loss of one or more data stores of a ZSC. As an example, a ZSC can comprise multiple hard drives and a chunk can be stored on more than one hard drive such that, if a hard drive fails, other hard drives of the ZSC can comprise the chunk, or a replicate of the chunk. As such, there can be redundancy in a zone and other redundancy between zones.

Recovery of data from a convolved chunk can be computer resource intensive, e.g., processor, memory, network, storage, etc., intensive. As an example, loss of access to data of a Seattle zone can result in deconvolution of convolved chunks in other zones as part of recovering the Seattle zone. The example deconvolution can comprise moving chunks between the other zones to enable the deconvolution at the other zones, use of processor time in the other zone, use of memory in the other zones, use of storage space in the other zones, etc. As such, it can be desirable to reduce the burden of a recovery process over many zones, e.g., it can be desirable that many processors, memories, storage devices, networks, etc., access less data to recover data. As an example, accessing a portion of a chunk, rather than a whole chunk, can be faster and less computer resource intensive, e.g., less network bandwidth, lower processor loading, less memory consumption, etc. In some geographically diverse storage systems, zones can be located substantially far apart, for example a Moscow Russia zone, a Seattle USA zone, A Sao Paolo, Brazil zone, etc., so reducing the amount of data access, transfer, etc., involved in data protection can be an important factor in a successful geographically diverse storage system.

In an aspect, compression/convolution of chunks can be performed by different compression/convolution technologies. Logical operations can be applied to chunk data to allow compressed data to be recoverable, e.g., by reversing the logical operations to revert to an earlier form of chunk data. As an example, data from chunk 1 can undergo an exclusive-or operation, hereinafter 'XOR', with data from chunk 2 to form chunk 3. This example can be reversed by XORing chunk 3 with chunk 2 to generate chunk 1, etc. While other logical and/or mathematical operations can be employed in compression of chunks, those operations are generally beyond the scope of the presently disclosed subject matter and, for clarity and brevity, only the XOR operator will be illustrated herein. However, it is noted that the disclosure is not so limited and that those other operations or combinations of operations can be substituted without departing from the scope of the present disclosure. As such, all logical and/or mathematical operations for compression germane to the disclosed subject matter are to be considered within the scope of the present disclosure even where not explicitly recited for the sake of clarity and brevity.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the Seattle and Dallas local chunks. An example technique can be "exclusive or" convolution, hereinafter 'XOR', '⊕', etc., where the data in the Seattle and Dallas local chunks can be convolved by XOR processes to form the Boston chunk, e.g., C=A1 ⊕B1, where A1 is a replica of the Seattle local chunk, B1 is a replica of the Dallas local chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter, in some embodiments, can be applied to data of a single disk, memory, drive, data storage device, etc., without departing from the scope of the disclosure, e.g., the zones in some embodiments can represent different logical areas of the single disk, memory, drive, data storage device, etc. Moreover, it will be noted that convolved chunks can be further convolved with other data, e.g., D=C1 ⊕E1, etc., where E1 is a replica of, for example, a Miami local chunk, E, C1 is a replica of the Boston partial chunk, C, from the previous example and D is an XOR of C1 and E1 located, for example, in Fargo.

In an aspect, XORs of data chunks in disparate geographic locations can provide for deconvolution of the XOR data chunk to regenerate the input data chunk data. Continuing a previous example, the Fargo chunk, D, can be de-convolved into C1 and E1 based on either C1 or D1; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, deconvolution can rely on retransmitting a replica chunk that so that it can be employed in de-convoluting the convolved chunk. As an example the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to deconvolve C. As an example, where the Seattle chunk, A, is corrupted, the data can be recovered from C by deconvolving C with a replica of the Dallas chunk B. As such, B can be replicated by copying B from Dallas to Boston as B1, then de-convolving C with B1 to recover A1, which can then be copied back to Seattle to replace corrupted chunk A.

In an aspect, erasure coding can be employed to protect data in a geographically diverse data storage system. Erasure coding can divide a data portion (D) into k data segments. During an encoding operation, m redundant coding segments can be created. Encoding can assure that a loss of any m segments of the k+m segments can be tolerated without loss of data access. If up to m segments are lost or become inaccessible (hereinafter simply 'lost' unless otherwise explicitly indicated otherwise), the missing segments can be restored via a decoding operation. An erasure coding protection scheme can be identified as resulting in k+m data segments, e.g., k data segment and m coding segments result for a single data portion of a protection set, e.g., for a data chunk, etc., see, for example, Chunk A of Zone A in system 500 of FIG. 5 having k=12 and m=4 for 12 data segments and four coding segments for Chunk A under a 12+4 erasure coding scheme, Chunk B of Zone A in system 500 of FIG. 5 having k=10 and m=2 for 10 data segments and two coding segments for Chunk B under a 10+2 erasure coding scheme, etc.

In an aspect, erasure coding can be employed at different levels of a geographically diverse storage system, e.g., hierarchical erasure coding, for example, at a zone-level to erasure encode/decode chunks, at a chunk-level to erasure encode/decode chunk segments, etc. In an aspect, different erasure coding schemes can be used for different levels, different chunks, etc. As an example, a 4+2 scheme can be employed at the zone-level, while a both a 12+4 scheme and a 10+2 scheme can be used at the chunk-level in a single zone to encode/decode different chunks. Moreover, for example, chunks from zone-level erasure coding can then be chunk-level erasure coded such that the resulting data segments of the chunks of a zone can be said to have been 'doubly erasure encoded.' This can result, via a decoding operation, in communicating/accessing less than a full chunk for recovery of less accessible data, e.g., lost data, corrupted data, missing data, failed communication with or in a zone, etc., as is discussed in more detail herein.

Rather than simply duplicating chunks between zones of a geographically diverse data storage system, even with convolution, erasure encoding, more especially hierarchical erasure encoding, can reduce the amount of data that needs to be accessed, communicated, processed, stored, etc., to facilitate a designated level of data robustness in the geographically diverse data storage system. For example, without erasure coding, for p+1 geographically distributed zones, there can be manipulation of at least p+1 chunks, for example, of 128 MB each, which can be computer resource intensive where more than a small number of chunks are compromised. With zone-level erasure encoding, the p+1 chunks can be encoded into fewer coding chunks that can consume less storage space and can be communicated/accessed with less computer resources than the p+1 chunks, for example, in a 4+2 erasure coding scheme, two coding chunks can be distributed to provide data protection rather than replicating and storing greater numbers of replicate chunks. Then, in this example, the coding chunks can be used to recover data rather than having to use the larger number of replicate chunks of a non-erasure coding system. Further, with a second level of erasure coding, e.g., chunk-level erasure coding, the compromised portions, e.g., compromised segments, etc., of an encoded chunk can be used to recover data, rather than using the entire encoded chunk of a single level erasure coding system.

Use of erasure coding, e.g., instead of basic XOR techniques, etc., to protect data in a geographically diverse storage system can be beneficial, for example by reducing computer resource demands in storing, recovering, etc., data chunks or portions thereof. Historically, erasure coding was created as a forward error correction method for binary erasure channels. However, more recently early attempts have been made to use erasure coding for data protection. Generally, erasure coding can divide a data portion, into k data fragments of equal size. During erasure coding encoding operations, m coding fragments can be created, which can enable access to data of the data portion, e.g., data of a data portion that has been erasure encoded into k+m fragments can be accessible with loss of up to m fragments, for example, in a 12+4 encoding, data can still be accessed despite the loss of up to four data fragments, four coding fragments, two data and two coding fragments, etc. It can be said that the way the encoding is done can assure that a system can tolerate the loss of any m fragments. The process of generating coding fragments can be referred to as 'encoding.' The process of recovering data fragments from an encoded data portion, e.g., using available data fragments and/or coding fragments, can be termed 'decoding.'

In an embodiment, if a geographically distributed data storage system is designated as being able to tolerate a loss of any m zones/clusters/chunks, Then a first level of erasure coding, for example, a zone-level erasure coding scheme, can cause replication of chunks of each to at least m remote zones. As a result, there can be m 'backup copies' of each chunk in other zones. One of these backup copies can be selected as a 'primary' backup copy, which can be employed in encoding according to the erasure coding scheme. Encoding can be performed by a given zone, e.g., a first zone, for the primary backup chunks of other zones that have been replicated into the first zone. The first zone can, for example, encode k primary chunks replicated to the first zone from k different zones of the geographically diverse data storage system. In an embodiment, the first zone can encoding the k replicated primary chunks because the size of a chunk is fixed, for example at 128 MB in ECS, and data padding or other data complements can be added as needed. Encoding can result in m data portions that can each be the same size as a chunk, e.g., the code chunks can be the same size as data chunks. In some embodiments, after encoding is complete, the first zone can store one coding chunk locally and move other m−1 coding chunks to remote zones, e.g., making sure the k+m data and coding chunks are stored at different zones, whereupon the primary backup chunks used for encoding, and their peer backup chunks at other zones, can be deleted to save storage space, e.g., storing coding chunks can consume less storage space that storing primary backup and peer backup chunks representing the same data. In an embodiment, per chunk capacity overheads for geographically diverse data storage systems employing a single level of erasure coding can be approximated by: Overhead=m/k*'chunk_size'. As an example, for a 10+2 scheme, the overhead is $\frac{1}{5}^{th}$ of a 'chunk size', and for a 128 MB chunk, the overhead can be (0.2)(128 MB)=25.6 MB.

Recovery of less accessible data under a single erasure coding scheme, e.g., zone erasure code scheme, can be resilient against loss of 1 to m chunks. Recovery of the inaccessible chunks can be, for example, as follows. For each unavailable chunk, k peer data chunks and corresponding coding chunks can be used to perform decoding. The resulting data portion(s) can then be stored as replacements for the less accessible chunk(s). It will be noted that this illustrates the recovery of entire less accessible chunks based on entire coding chunks and entire data chunks. It will further be noted that where the number of zones in a geographically diverse data storage system is greater or equal to k+m, and where all the data and coding chunks are effectively distributed among the zones, the distributed storage can be resilient to loss of up to m zones, clusters, or chunks because erasure encoding provides a mechanism to recover compromised chunks. A more detailed example is provided herein, see, for example, FIG. 2 to FIG. 4.

A second level of erasure encoding can be applied to chunks resulting from a first level of erasure encoding. It is noted that rather than recovering an entire chunk as previously illustrated, data represented in a chunk in a geographically diverse storage system can be accessible without needing to recover the entire chunk content, e.g., recovering a missing data segment, corrupt data segment, etc., of a chunk can be sufficient to enable access to the data represented in the chunk. Recovery of a smaller piece of data can result in higher efficiency, shorter duration of the recovery operations, less burdening of computing resources, etc. As an example, where a chunk that is stored according to a zone-level erasure coding scheme is stored on a hard drive in a data center and a portion of the hard drive is corrupted, the corruption of the hard drive may only affect a small portion of the stored chunk, for example, in a 10+2 second level erasure encoding with 12 segments, loss of $\frac{3}{12}^{ths}$ of the chunk can result in the data not being accessible, etc. In this example, rather than recover the entire chunk, it can be sufficient to recover the $\frac{1}{12}^{th}$ of the chunk. Recovering the $\frac{1}{12}^{th}$ of the chunk can result in the chunk having only 2 lost segments, which according to 10+2 erasure encoding, is sufficient to still allow data access, e.g., the 10+2 coding hardens the chunk against loss of up to 2 segments without needing to undergo a recovery from a remotely stored segment from another chunk or zone. In some embodiments, all of the $\frac{3}{12}^{ths}$ of the chunk can be recovered so that the chunk does not comprise any inaccessible segments. A more detailed example is provided herein, see, for example, FIG. 5 to FIG. 6.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate chunk segment recovery via hierarchical erasure coding in a geographically diverse data storage system, in accordance with aspects of the subject disclosure. System 100 can comprise zone storage components (ZSCs), e.g., first ZSC 110, second ZSC 120, N-th ZSC 130, etc. The ZSCs can communicate with the other ZSCs of system 100, e.g., via communication framework 102, etc. A zone can correspond to a geographic location or region. As such, different zones can be associated with different geographic locations or regions. A ZSC can comprise one or more data stores in one or more locations. In an aspect, a ZSC can store at least part of a data chunk on at least part of one data storage device, e.g., hard drive, flash memory, optical disk, server storage, etc. Moreover, a ZSC can store at least part of one or more data chunks on one or more data storage devices, e.g., on one or more hard disks, across one or more hard disks, etc. As an example, a ZSC can comprise one or more data storage devices in one or more data storage centers corresponding to a zone, such as a first hard drive in a first location proximate to Miami, a second hard drive also proximate to Miami, a third hard drive proximate to Orlando, etc., where the related portions of the first, second, and third hard drives correspond to, for example, a 'Florida zone', 'Southeastern United States zone', etc.

In an aspect, data chunks, e.g., chunk 112 to chunk 116, 122 to 126, 132 to 136, etc., can be replicated in their source zone, in a geographically diverse zone, in their source zone and one or more geographically diverse zones, etc. As an example, a Seattle zone can comprise a first chunk that can be replicated in the Seattle zone to provide data redundancy in the Seattle zone, e.g., the first chunk can have one or more replicated chunks in the Seattle zone, such as on different storage devices corresponding to the Seattle zone, thereby providing intra-zone data redundancy that can protect the data of the first chunk, for example, where a storage device storing the first chunk or a replicate thereof becomes compromised, the other replicates (or the first chunk itself) can remain uncompromised within the zone. In an aspect, data replication in a zone can be on one or more storage devices, e.g., a chunk can be stored on a first data storage device, a second chunk can be stored on a second storage device, and a third chunk can be stored on a third storage device, wherein the first, second, and third storage devices correspond to the first zone, and wherein the first, second, and third storage devices can be the same storage device or different storage devices. Replication of chunks, e.g., the first chunk, into other chunks can comprise communicating data, e.g., over a network, bus, etc., e.g., communications framework 102, etc., to other data storage locations on the first, second, and third storage devices and, moreover, can consume data storage resources, e.g., drive space, etc., upon replication. Further access, communication, etc., of chunks can consume or burden computing resources of one or more ZSCs, components of communication framework 102, etc., wherein computing resources can comprise processing of operations on one or more processors, use of one or more memories, use of one or more network resources, etc. As such, the number of replicates and/or storage schema can be based on balancing resource costs, e.g., network traffic, processing time, cost of storage space, etc., against a level of data redundancy, e.g., how much redundancy is needed to provide a level of confidence that the data/replicated data will be available.

In an aspect, system 100 can comprise one or more erasure coding control components (ECCC), e.g., ECCC 108, 118, 128, 138, etc. An ECCC can enable erasure coding of data. In an aspect, an ECCC can facilitate one or more erasure coding schemes, for example, a zone erasure coding scheme that erasure codes at the chunk-level between zones of a geographically diverse data storage system, hereinafter 'GEO', a chunk-level erasure coding scheme that erasure codes at the chunk segment level for a chunk in a zone of a GEO, etc., or combinations thereof, e.g., in a hierarchical manner, etc. In an embodiment, ECCC 108 can interact with the ZSCs of system 100 via communication framework 102 to orchestrate erasure coding scheme(s) for system 100. In another embodiment, ECCC 108 can orchestrate a first erasure coding scheme, e.g., a zone-level erasure coding scheme, etc., between ZSCs of system 100, while ECCCs 118, 128, 138, etc., each orchestrate a second erasure coding scheme, e.g., a chunk-level reassure coding scheme, etc., at corresponding ZSCs 110, 120, 130, etc. Other embodiments are readily appreciated and are to be considered within the scope of the present disclosure even where not explicitly recited for the sake of clarity and brevity.

In an aspect, an ECCC can enable encoding according to an erasure coding scheme. In a further aspect, an ECCC can enable decoding based on an erasure coding scheme. As an example, ECCC 118 can interact with other ECCCs, e.g., 128, 138, 108, etc., to enable a zone-level erasure encoding of a chunk of chunks 112 to 116 among ZSCs 110-130, etc., and can further enable a chunk-level encoding of a chunk that was subject to the zone-level erasure encoding, e.g., the chunk-level encoding can encode chunk segments for a chunk that can be an encoded chunk of a zone-level erasure encoding. Accordingly, this example hierarchical erasure encoding can illustrate that the zone-level encoding can, in an embodiment, protect against the loss of a whole chunk, a whole zone, etc., while the chunk-level encoding can, in the embodiment, protect against loss of a chunk segment of a chunk in a zone. Moreover, the example hierarchical erasure encoding can allow for system 100 to consume fewer computing resources than would otherwise be required to recover a whole chunk to replace a compromised chunk, where recovery of a chunk segment of the compromised chunk would be sufficient to enable access to data represented in the compromised chunk.

Figure 2:
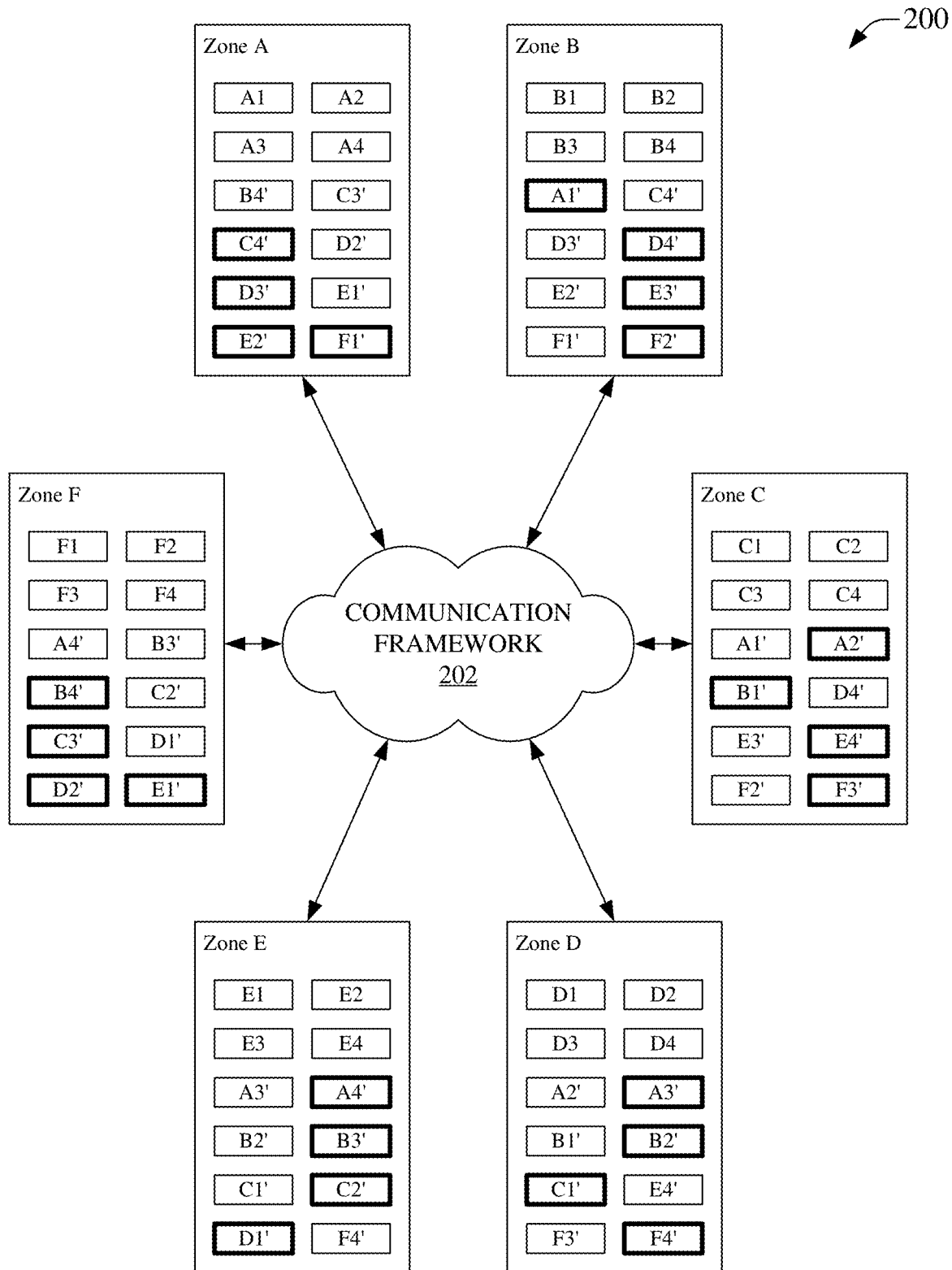
FIG. 2 is an illustration of an example system that can facilitate zone-level erasure coding via replication of data chunks in a geographically diverse storage system, in accordance with aspects of the subject disclosure.

FIG. 2 is an illustration of a system 200, which can enable zone-level erasure coding via replication of data chunks in a geographically diverse storage system, in accordance with aspects of the subject disclosure. System 200 can comprise a GEO having zones A-F, e.g., six zones. Each of the zones can store data chunks, e.g., Zone A can store chunks A1-A4. Moreover, each of the zones can store other chunks, for example, replicates of chunks from other zones, e.g., Zone A can store chunks B4', C3', C4', . . . , F1', etc., which can correspondingly be replicates of B4, C3, C4, . . . , F1, etc., from other zones, e.g., Zones B-F, etc. In an aspect, some of the replicates can be primary replicates, e.g., those indicate with a thickened border, while secondary, tertiary, etc., replicates can be stored at other zones, e.g., in Zone A, replicate C4' with a bold border can be a primary replicate of chunk C4 from Zone C, and Zone B can store a secondary replicate of C4, e.g., C4' without a bold border, etc. Additionally, each zone can store code chunks (not illustrated, but see shaded chunks in FIG. 3, e.g., shaded chunk CDEF1, etc., of Zone A in system 200, etc.) A code chunk can result from encoding of data chunks. As an example, a data chunk can be used to directly store user provided data, e.g., chunk A1, A2, A3, A4, etc., of Zone A in system 200, while a code chunk can comprise data that can be used via erasure code decoding of available data to generate data other data, e.g., remaining data chunks can be decoded based on code chunks to recover lost chunks. As can be observed, Zone A replicates its chunk A1 to Zone B and Zone C; chunk A2 to Zone C and Zone D; chunk A3 to Zone D and Zone E; and chunk A4 to Zone E and Zone F. Similar processes can be undertaken for the remainder of the zones. In an aspect, storage of a data chunk and a code chunk is generally indistinguishable, which, in some embodiments, can allow for a second layer of erasure coding to be performed on code chunks and corresponding data chunks.

System 200 can illustrate an example set of data chunks and their primary replicate chunks and secondary replicate chunks distributed in an example six-zone GEO. It can be appreciated from FIG. 2 that if Zone A were to fail, recovery of chunks A1-A4 is easily achieved simply by copying one of the replicates, either a primary replicate or a secondary replicate, for each of A1 to A4 from another zone of system 200. As an example, A1' bold can be recovered directly from Zone B, A2' and A3' bold can be recovered directly from Zone D, etc. It is also readily observable that the data redundancy of distributing full replicas of chunks at other ZSCs can be computer resource intensive, especially in regards to storage space consumed, e.g., each zone of system 200 stored 12 full chunks to provide protection for four full chunks of each zone, eight of these full chunks is communicated into each receiving zone via communications framework 202, and recovery of a failed zone would then require communication of four full chunks and subsequent refreshing of primary and secondary replicate distribution between the zones. However, erasure coding can be applied at the zone level to reduce the computer resource overhead as is illustrated in more detail in FIG. 3.

Figure 3:
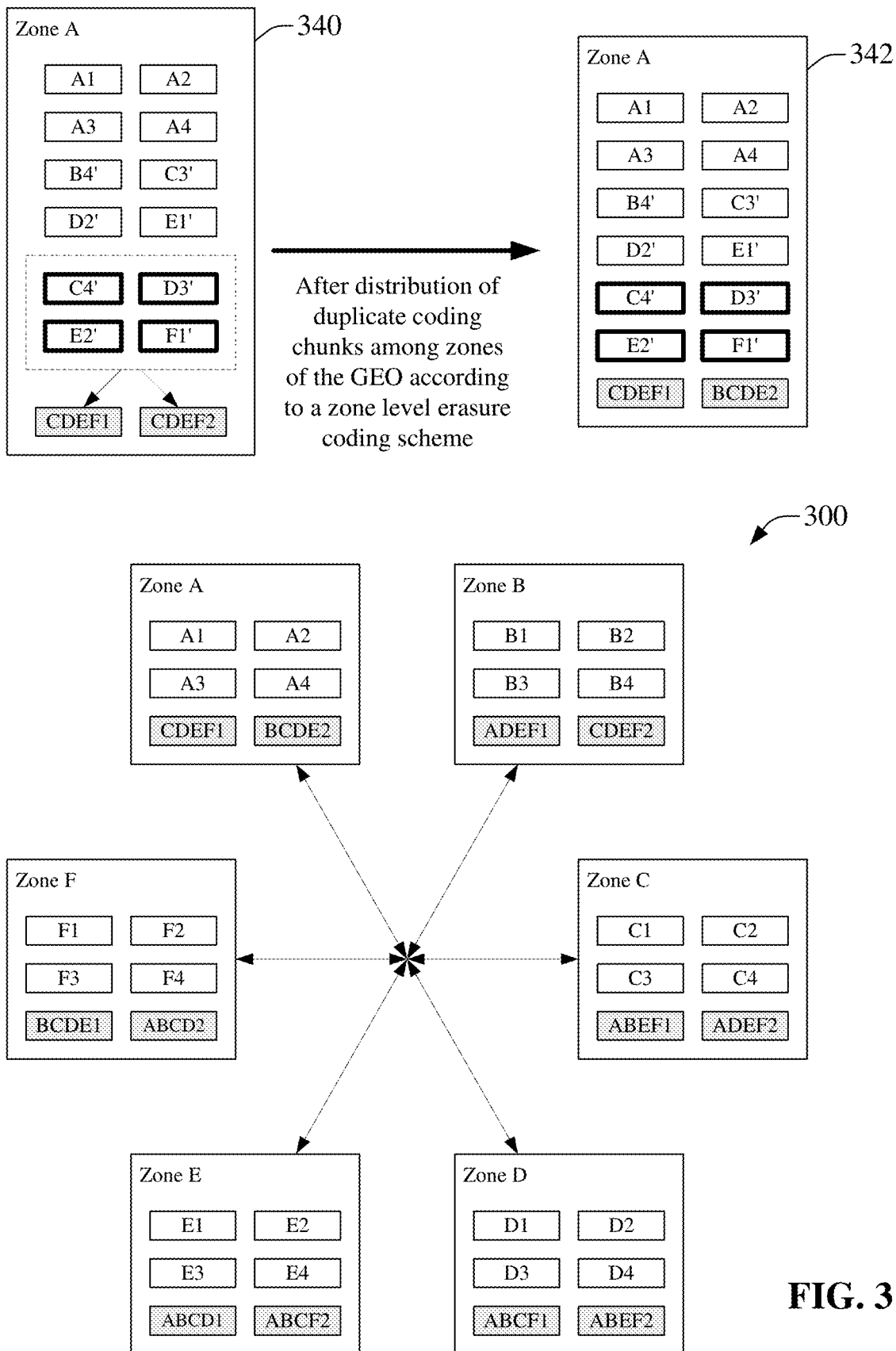
FIG. 3 is an illustration of an example system that can enable zone-level erasure coding via creation and distribution of code chunks in a geographically diverse storage system, in accordance with aspects of the subject disclosure.

FIG. 3 is an illustration of a system 300, which can facilitate zone-level erasure coding via creation and distribution of code chunks in a geographically diverse storage system, in accordance with aspects of the subject disclosure. System 300 can illustrate a first encoding of replicate data according to a first erasure coding scheme, e.g., a zone-level encoding scheme, etc. Zone A of system 300 can comprise data chunks A1-A4 and encoded code chunks CDEF1 and BCDE2 that can be code chunks that can be used to decode lost data chunks in other zones or other lost zones. In FIG. 3, at 340, Zone A can comprise chunks that can be the same as the chunks of Zone A of FIG. 2, and can additionally comprise code chunks generated from the primary replicates C4', D3', E2', and F1', e.g., which can be primary replicates of C4, D3, E2, and F1 from Zones C, D, E, and F.

In an aspect, the code chunk CDEF2 can be a replicate of code chunk CDEF1. FIG. 3 can illustrate a 4+2 erasure coding scheme, e.g., 2 coding chunks are created for 4 data chunks. After creation of the two code chunks, one copy, e.g., CDEF2, can be moved to another zone to provide protection against chunk CDEF1 becoming less accessible, for example, where the code chunk or the zone becomes inaccessible, etc. Similarly, at 342 of FIG. 3, a copy of a code chunk, for example from Zone F, can be moved to Zone A, e.g., BCDE2 can be moved from Zone F, leaving BCDE1 at Zone F, into Zone A. The other five zones, e.g., B-F, can similarly produce their own coding chunks from their stored primary backup chunks, e.g., non-primary backup chunks can be ignored in the creation of the illustrated code chunks in each zone. Further, each other zone can similarly move a copy of a code chunk to another zone for protection and redundancy.

After the code chunks are created and a copy is moved to another zone for protection, the contributing primary chunks in each zone become unnecessarily redundant. Similarly, the secondary, tertiary, etc., backup chunks also become unnecessarily redundant because the code chunks are also stored in multiple zones. As such, all backup chunks can be deleted, which can result in a first zone storing its data chunks, a first code chunk for primary data chunks of a second zone, and a second code chunk for primary chunks of a third zone. The deletion of backup chunks in other zones can similarly be performed with the example illustrated results depicted in system 300. System 300 can be compared with system 200, wherein each comprises sufficient chunks to enable access to data comprised in the chunks and to protect against loss of at least one chunk or zone. However, system 200 uses 12 chunks worth of storage space in each zone to achieve this result, while in contrast, system 300 uses only six chunks of storage space in each zone.

In this particular example system 300, the capacity overheads associated with replication is reduced by a factor of four, e.g., two coding chunks in example system 300 can use ¼th the space of eight backup chunks illustrated in example system 200. Further, the zone-level erasure coding illustrated, e.g., the 4+2 erasure coding, enables the GEO to recover data from failures of up to two zones, up to two chunks, etc.

Figure 4:
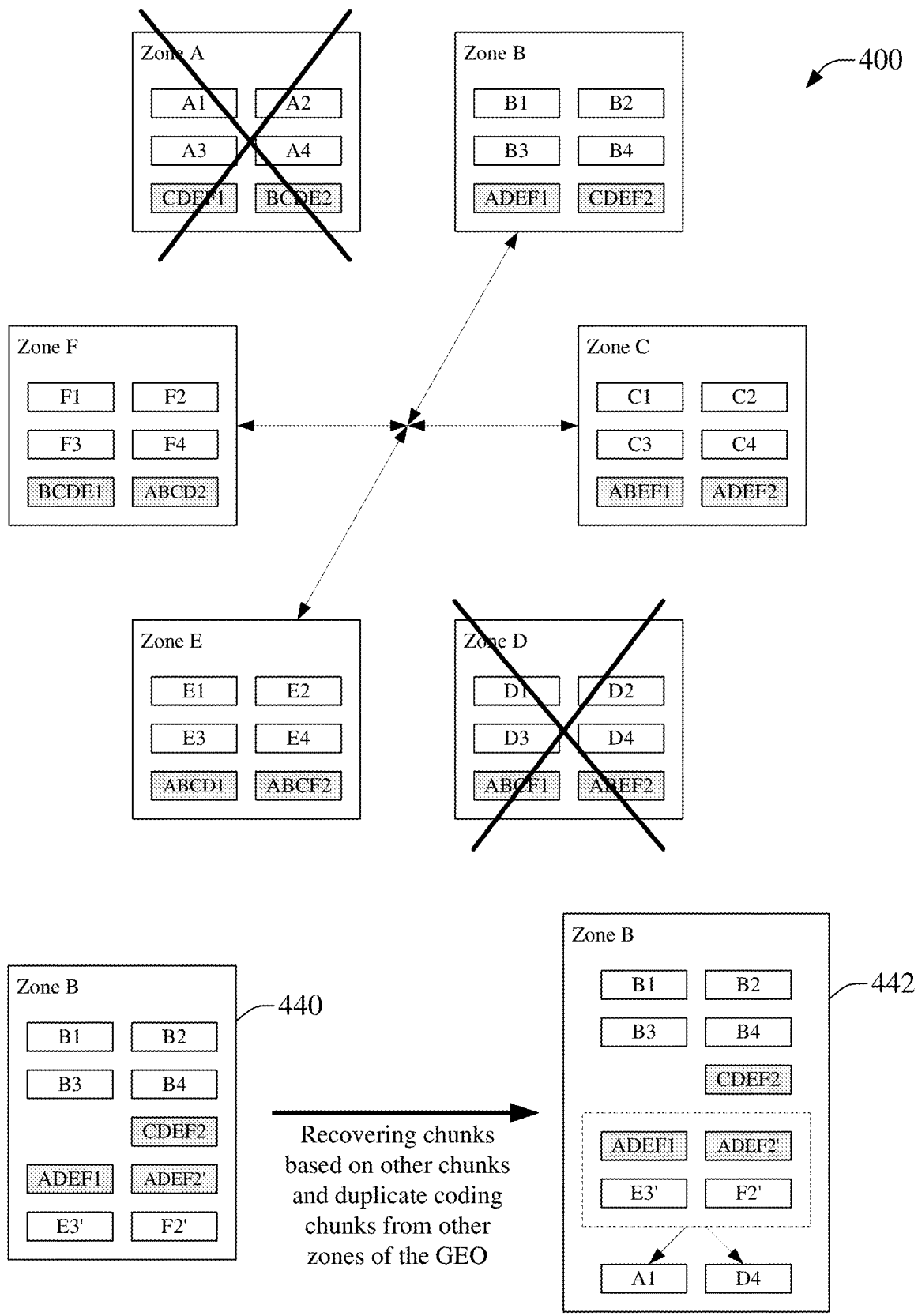
FIG. 4 illustrates an example system that can facilitate chunk recovery based on zone-level erasure coded chunks in a geographically diverse storage system, in accordance with aspects of the subject disclosure.

FIG. 4 is an illustration of a system 400, which can facilitate chunk recovery based on zone-level erasure coded chunks in a geographically diverse storage system, in accordance with aspects of the subject disclosure. System 400 can illustrate recovery of lost data stored under a first erasure coding scheme, e.g., a zone-level erasure coding scheme. System 400 can be the same as, or similar to, system 300, except that Zone A and Zone D have become less accessible, e.g., zones A and D have been lost, for example by a hardware, software, or network failure, etc., as in indicated by the "X" through each of Zone A and Zone D and the lack of a flow arrow from them to other zones of system 400.

In an embodiment, Zone B at 440 can begin recovery of data chunks that have become inaccessible in Zone A and Zone D. Recovery can comprise Zone B receiving ADEF2', which can be a copy of ADEF2 stored on Zone C. Zone B can further receive copies of E3 a F2 correspondingly from Zones E and F, e.g., represented as E3' and F2' in Zone B. Zone B can then decode ADEF1, ADEF2', E3', and F2', to generate chunks A1 and D4, which can represent the same data lost in Zone A chunks A1 and D4. A similar process, not illustrated for the sake of clarity, can be performed at Zone C to recover A2, at Zone E to recover A4 and D1, and at Zone F to recover D2. Chunks A3 and D3 had primary replicates at Zones A and D, see system 200, etc., that contributed to the code chunks CDEF1 and ABCF1 correspondingly. Where CDEF1 and ABCF1 are not accessible, due to the loss of Zones A and D in this example, the code chunk replicates can be used from Zone B and Zone E, respectively, also not illustrated for the sake of clarity, e.g., at Zone B code chunk CDEF2 and copies of data chunks C4', E2', and F1', from Zones C, E, and F, can be used to recover D3, and at Zone E code chunk ABCF2 and copies of data chunks B2', C1', and F4', from Zones B, C, and F, can be used to recover A3. It is noted that with the loss of two zones, each of the recoveries uses four chunks to recover data, e.g., two code chunks and two data chunks, one code chunk and three data chunks, etc., which is due to the example zone-level erasure coding being a 4+2 scheme that can generate two code chunks and can recover data with four of the six correlated chunks, e.g., any four of the 4 data+2 code chunks. In an aspect, the chunks illustrated in system 300, e.g., that are demonstrated as providing data recovery in system 400, can further be subjected to a second erasure encoding, e.g., resulting in a hierarchical erasure coding scheme for a GEO, see FIG. 5, etc.

Figure 5:
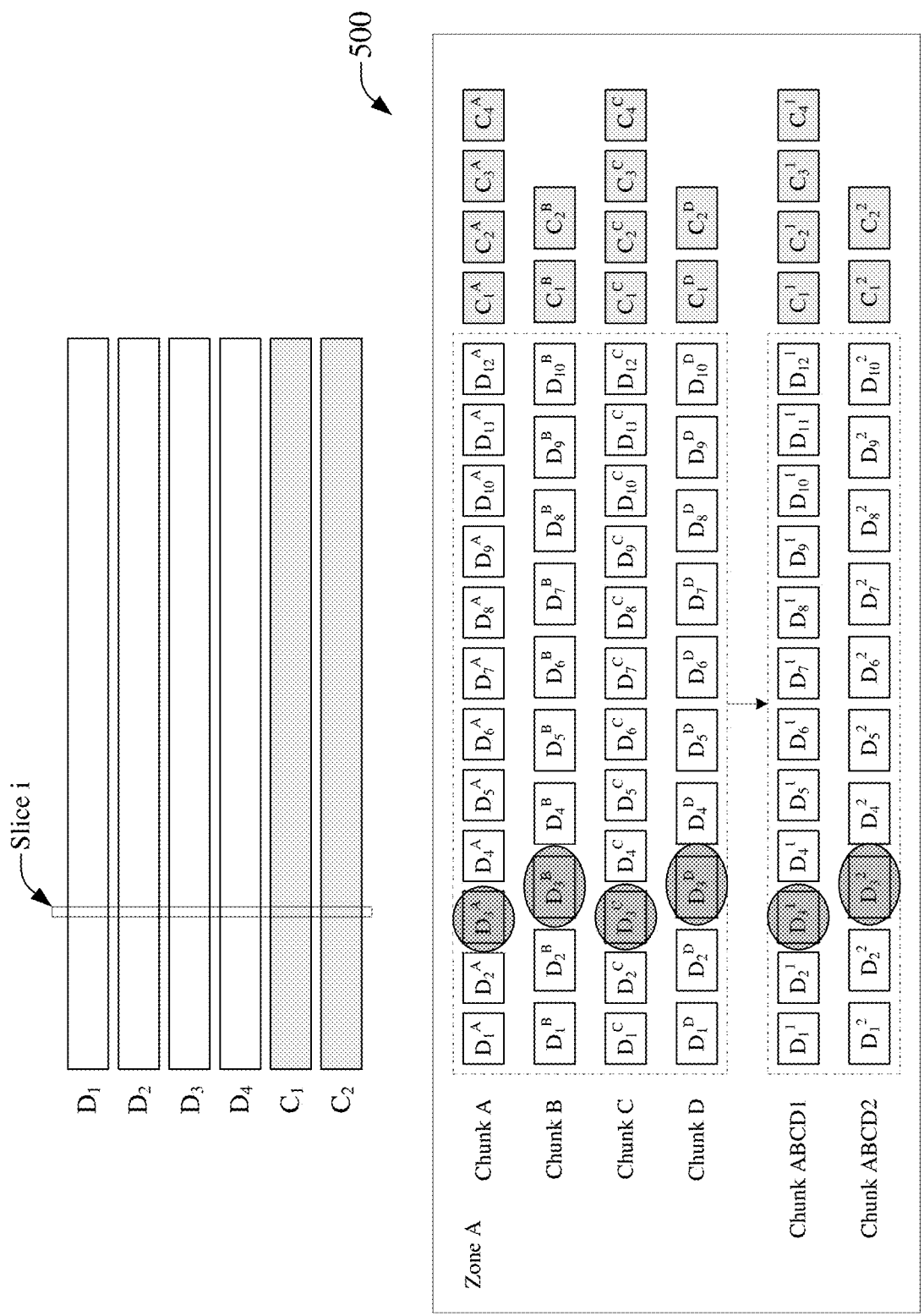
FIG. 5 is an illustration of an example system that can enable chunk-level erasure coding via coding segments of data/coding chunks, in accordance with aspects of the subject disclosure.

FIG. 5 is an illustration of a system 500, which can facilitate chunk-level erasure coding via coding segments of data/coding chunks, in accordance with aspects of the subject disclosure. System 500 can be a GEO protection set that can comprise data chunks and code chunks from a first erasure coding scheme, wherein each chunk (regardless of a data or code chunk) can then be subject to a further erasure coding scheme resulting in chunk segments and code segments. As an example, chunk A of example Zone A of system 500 can comprise 12 chunk segments and four code segments based on a 12+4 erasure coding scheme performed at the chunk level, e.g., a chunk-level erasure coding scheme. As a second example, chunk B of example Zone A of system 500 can comprise 10 chunk segments and two code segments based on a 10+2 chunk-level erasure coding scheme. Similarly, chunks C, D, ABCD1, and ABCD2 can also be protected by employing a chunk-level erasure coding scheme.

In Zone A of system 500, the chunk segments of the chunks A-D, ABCD1, and ABCD2 can be can correspondingly represent the data stored in the chunks, for example, where a chunk is 128 MB and is subject to a 10+2 erasure coding, each segment can be (128/10) MB in size (approx. 12.8 MB per segment), or where subject to a 12+4 erasure coding, each segment can be (128/12) MB in size (approx. 10.66 MB per segment). The code segments will be of the same size as the chunk segments. For a GEO comprising 6 zones and using a 4+2 zone-level erasure coding, there can be four data chunks for every two coding chunks per zone, see for example system 300. These can be represented by chunks A to D and chunks ABCD1 and ABCD2. These chunks can then be doubly encoded in another erasure coding scheme, e.g., as segments D1A to D12A and C1A to C4A for chunk A, etc. Of note, in this document, segment $D_1^A$ can also be written as segment D1A, e.g., without the super- and sub-scripts, for simplicity and readability. Each zone therefore can protect a data/coding chunk it stores under another erasure coding. It is noted that all chunks of Zone A can be secondarily erasure coded with a same erasure code, e.g., all chunks could be encoded under a 10+2, all chunks under a 12+4, etc., however, example system 500 illustrates use of different erasure coding schemes, e.g., 12+4 and 10+2, simultaneously.

Encoding and decoding can be implemented by 'slicing' related data and coding chunks during the second erasure coding. More generally, slices of any data portion can result in corresponding code portions, e.g., under the 4+2 at the zone-level, four data chunks generate two code chunks, etc. In system 500, the chunks are a mix of data chunks and code chunks (the results of the first example 4+2 erasure coding), and the data portion can be a 'slice', e.g., slice i, across four data portions D1-D4 and two code portions C1 to C2, which can be generalizations of Clunks A-D and Chunks ABCD1 and ABCD2, e.g., slice i can be comprised in the shaded and circled segments of the chunks of Zone A in system 500. Slices can be nearly any size, e.g., the default slice size for the erasure coding implementation used in ECS is ½-byte, but in general, a slice size can be related to the erasure coding scheme selected along with any optimization methods used and, for example, can vary from 1 bit to several bytes, or more. As such, each data/coding chunk may be represented as a sequence of slices, where each slice has a fixed size. Encoding or decoding can be implemented as a series of calculations performed upon these slices, and accordingly, it can be appreciated that data of the $i^{th}$ slice of each data/code chunk is related through the logic of erasure coding. As an example, in a 4+2 erasure coding scheme applied to zones encoding whole chunks, everything needed to restore content of the $i^{th}$ slice of some data chunk $D_j$ is the $i^{th}$ slices of 4 other data and/or coding chunks. In a similar second example, in a 12+4 erasure coding scheme applied to chunks encoding chunk segments, everything needed to restore content of the $i^{th}$ slice of some data chunk $D_j$ is the $i^{th}$ slices of 12 other data and/or coding segments.

In an embodiment, a missing/corrupt data segment of a data chunk can be represented as a sequence of N slices, where N depends on the slice size and the data fragment size (the latter depends on a protection scheme used at the zone level). In this manner, data segment recover can depend on decoding of only N slices, rather than decoding of an entire chunk. Accordingly, the amount of data to gather and process to recover a data segment can be represented as 'S' and can be estimated by S=k*data fragment size, where data fragment size≈N*slice size. As an example, in a 10+2 erasure coding of a 128 MB chunk, the segment size is 12.8 MB from dividing the chunk into 10 segments, accordingly, in the example 4+2 erasure coding of the GEO, S=4*12.8 MB=51.2 MB, which can be contrasted to recovering an entire chunk under the 4+2 erasure coding which would consume 512 MB. This example illustrates that the use of a second level of erasure coding can allow for recovery of portions of a chunk that can be defective, e.g., memory cell on a hard disk fails, a bit flip in a write operation corrupts a segment of a chunk, etc. This finer grain recovery can be much less encumbering on computing resources of a GEO, zone, etc., than where only a single level of erasure coding is applied, for example at the zone level of a GEO. It is also noted that the larger the k of the second level erasure coding, the finer the grain of the recovery for a given chunk size and the lower the data needed to recover from a loss of a corresponding segment. However, as the second level erasure coding k increases, there can be a greater chance of a loss of multiple contiguous segments, e.g., if 12.8 MB of disk is damaged and the segment size is 12.8 MB, then only one segment is damaged, however if the segment size is 1.28 MB, then 10 contiguous segments would have been damaged.

Figure 6:
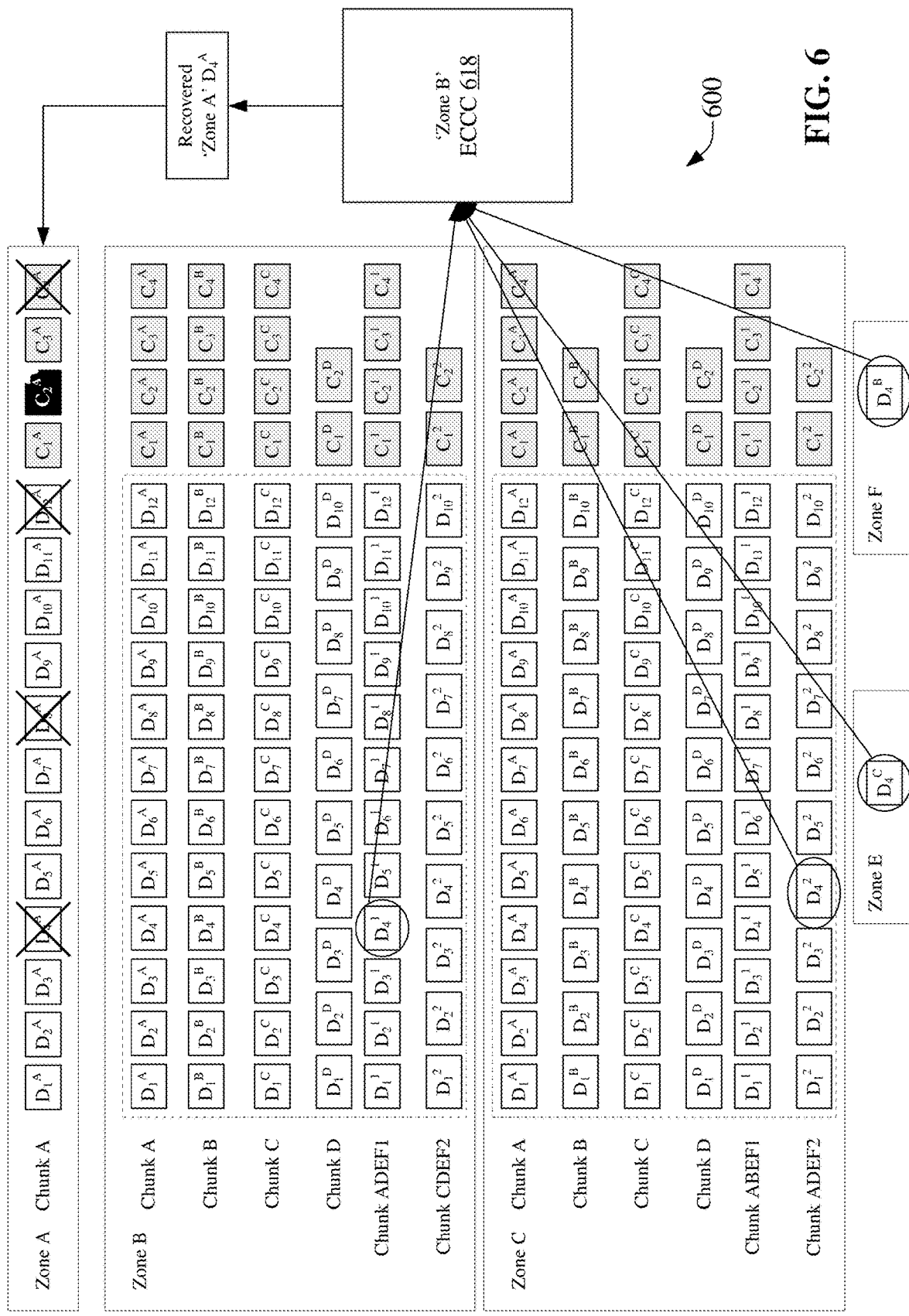
FIG. 6 is an illustration of an example system that can facilitate chunk segment recovery based on hierarchical erasure coded chunk segments in a geographically diverse storage system, in accordance with aspects of the subject disclosure.

FIG. 6 is an illustration of a system 600, which can facilitate chunk segment recovery based on hierarchical erasure coded chunk segments in a geographically diverse storage system, in accordance with aspects of the subject disclosure. System 600 can comprise Zones A to F that can be comprised in a GEO, note that Zone D is not illustrated in accord with system 400 to make understanding the disclosed subject matter easier by mirroring system 400 in part, although in some embodiments other zones, including Zone D, can be comprised in the GEO without departing form the scope of the disclosed subject matter. In an embodiment, these zones can be the same as, or similar to, the zones of system 200, but can have stored data according to a hierarchical erasure coding scheme. The hierarchical erasure coding scheme can comprise, for example, a first level of erasure coding that can be the same as, or similar to, that illustrated in FIG. 2 through FIG. 4, and can comprise, for example, a second level of erasure coding that can be the same as, or similar to, that illustrated in FIG. 5. It will be noted that not all chunks, chunk segments, etc., of each zone may be illustrated for the sake of clarity and brevity.

System 600 can comprise ECCC 618 that can be an ECCC serving Zone B. In an embodiment, ECCC 618 can facilitate recovery of data, e.g., a recovered chunk segment, etc., related to Zone A and, in some embodiments, can aid in replacing a less accessible chunk segment of a chunk of Zone A with a corresponding recovered chunk segment to enable access to data represented, for example, in Chunk A of Zone A. In some embodiments a recovered chunk segment can be placed in another zone, e.g., Zone B, C, . . . , F, etc., or into a new zone (not illustrated).

Whereas system 600 can illustrate an example hierarchical erasure coding of chunk data that can result in the illustrated chunk segments, it can be observed in the example system that Zone A can comprise Chunk A that can comprise 16 chunk segments, e.g., data segments D1A to D12A and code segments C1A to C4A. Accordingly, Chunk A of Zone A can be understood to employ a 12+4 second level erasure coding scheme. As such, Chunk A of Zone A can be resilient against the loss of up to four segments of the chunk, e.g., some combination of data segments and code segments not exceeding the four segment resiliency of the 12+4 erasure coding scheme. Illustrated, Chunk A of Zone A can lose segments D4A, D8A, D12A, and C4A and still facilitate access to the data represented in Chunk A of Zone A. However, if, for example, segment C2A then becomes corrupted, the number of less accessible segments can exceed the four segment resiliency of the illustrated erasure coding scheme and data represented in Chunk A of Zone A can become less accessible, e.g., Chunk A of Zone A can be considered 'lost' due to having too many inaccessible segments.

Recovery of less accessible segments can be in response to determining that a segment has become less accessible. In some embodiments, for example where the erasure coding scheme for the chunk segments provides some resiliency against segment loss, the recovery of less accessible segments may be triggered after the count of less accessible segments exceeds a threshold level of lost segments correlated to the second level erasure coding scheme. As an example, recovery can be triggered in response to determining that more than four segments have become inaccessible in chunk protected by a 12+4 second level erasure coding scheme. As a second example, recovery can be triggered in response to determining that more than two segments have become inaccessible in chunk protected by a 10+2 second level erasure coding scheme. However, it is noted that recovery of segments can occur before the chunk becomes less accessible. As an example, recovery can be triggered in response to determining that less than five segments have become inaccessible in chunk protected by a 12+4 second level erasure coding scheme. As a second example, recovery can be triggered in response to determining that less than three segments have become inaccessible in chunk protected by a 10+2 second level erasure coding scheme. In some embodiments, the recovery of a segment can be triggered in response to determining that one segment has become less accessible.

Returning to the scenario where Chunk A of Zone A in system 600 has five less accessible segments, e.g., D4A, D8A, D12A, C2A, and C4A, ECCC 618 can receive data from corresponding segments of other zones, e.g., the circled segments of Zones B, C, E, and F, for example. In this example, four corresponding segments can be received based on the example 4+2 first level erasure coding at the chunk level. This can be due to the ability of system 600 to recover the whole of chunk A of Zone A based on the 4+2 erasure coding at the zone level, but can be an improvement over single level erasure coding at the zone level by allowing recovery of segments based on the application of other levels of erasure coding on top of the first level of erasure coding, e.g., the 12+4 second level erasure coding of Chunk A of Zone A, the 12+4 second level erasure coding of Chunk ADEF1 of Zone B, the 10+2 second level erasure coding of Chunk ADEF2 of Zone C, etc. Accordingly, to recover D4A of Chunk A of Zone A, the fourth segment of relevant chunks of four of the other five zones of system 600, e.g., Zones B-F, can be received at ECCC 618. The relevant chunks can be determined according to the first level of erasure coding at the zone level, and the fourth segment of these relevant chunks can be selected based on the second levels or erasure coding and the goal of recovering the fourth segment of Chunk A of Zone A, e.g., D4A of Chunk A of Zone A. ECCC 618 can then decode the four other relevant chunk segments from the other zones to generate recovered D4A for chunk A of Zone A, as illustrated.

In an embodiment, Zone B, and correspondingly ECCC 618, can be selected to perform the recovery based on Zone B comprising a local copy of coding chunk ADEF1. However, in some embodiments, Zone C and a corresponding ECCC could be selected where Zone C comprises a local copy of coding chunk ADEF2. In some embodiments, other Zones can be employed, e.g., Zone E, F, etc., where they comprise chunks relevant to the recovery of a determined lost chunk segment.

In an aspect, the use of different protection schemes, e.g., different second level erasure coding schemes, by different zones can be accounted for by indexing to the relevant segment of each relevant chunk according to a determined offset and a determined size. The offset and size, as illustrated at FIG. 5, can depend on the erasure coding scheme used by each chunk. As an example, Chunk A of Zone A can lose chunk segment D4A and recovery can therefore be performed with the fourth segments of relevant chunks in other zones of the GEO. The offset of segment D4A of chunk A of Zone A can be determined as chunk_size/12*3, where the erasure coding is identified as 12+4 erasure coding and the there are three previous chunk segments, e.g., D1A, D2A, and D3A. The size of segment D4A of chunk A of Zone A can be determined as chunk_size/12, where the erasure coding is identified as 12+4 erasure coding. Accordingly, selecting a related segment, for example, from Chunk ADEF2 of Zone C, which uses a 10+2 second level erasure coding, can be: Offset=chunk_size/10*3, Size=chunk_size/10, to allow selection of the fourth segment of Chunk ADEF2 of Zone C. Similar selection can occur at other relevant chunks/zones. Then, for example, recovered $D_4^A$ of Zone A=(copy of $D_4^B$ of Zone F, copy of $D_4^C$ of Zone E, copy of $D_4^1$ of Zone B, copy of $D_4^2$ of Zone C). Similarly, to recover, for example, lost segment D8A of Chunk A of Zone A, the recovered $D_8^A$ of Zone A=(copy of $D_8^B$ of Zone F, copy of $D_8^C$ of Zone E, copy of $D_8^1$ of Zone B, copy of $D_8^2$ of Zone C), noting that not all chunk segments are illustrated in FIG. 6 for clarity and brevity. Additionally, segments D12A of Chunk A of Zone A can similarly be recovered. Upon recovery of the lost data segments of Chunk A of Zone A, Chunk A of Zone A can be re-protected according to a second-level erasure coding scheme, e.g., segments C1A to C4A of Chunk A of Zone A can be updated after the recovery of the lost segments D4A, D8A, and D12A of Chunk A of Zone A.

Accordingly, system 600 can illustrate the disclosed hierarchical erasure coding technique can reduce burdens on computing resources, e.g., reducing data traffic between zones, processing of received data for recovery, data storage, etc., in contrast to conventional geographically distributed XOR-type data storage, single level erasure coding in a GEO, etc. This improvement in computing resource consumption can be viewed as needing to communicate less data between zones for a recovery operation, less load on a zone that drives recovery because there is less data to process for the recovery operation, etc. In system 600, for example, the amount of data to transfer between the zones and to handle by the zone that drives recovery can be four times less than with the straightforward GEO recovery that works at the chunk level, which can be because, under the double erasure coding technique, only three data fragments out of 12 need to be recovered, rather than recovering an entire chunk because of a few lost portions of the chunk.

Figure 7:
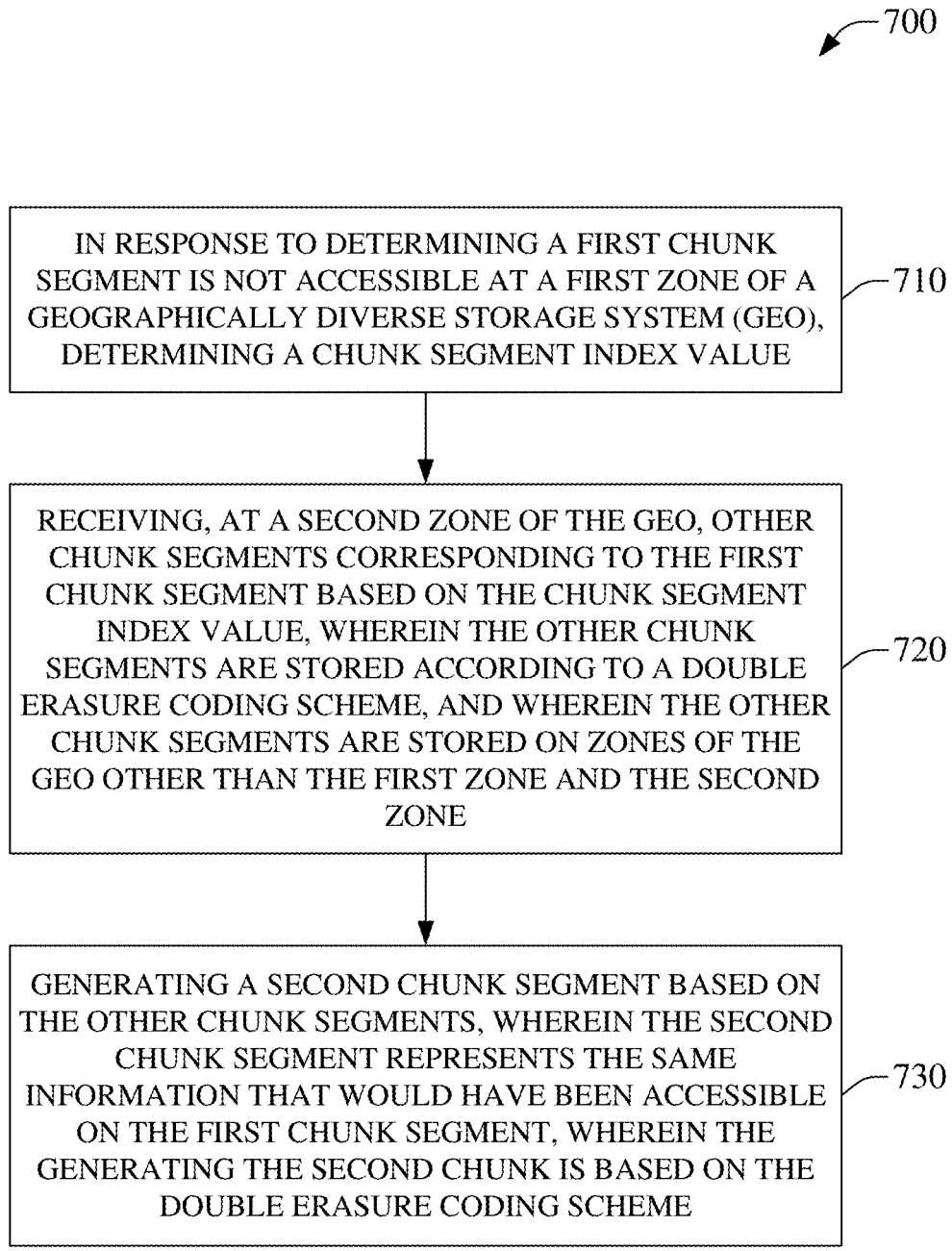
FIG. 7 is an illustration of an example method facilitating chunk segment recovery based on hierarchical erasure coding of data stored in a geographically diverse data storage system, in accordance with aspects of the subject disclosure.
Figure 8:
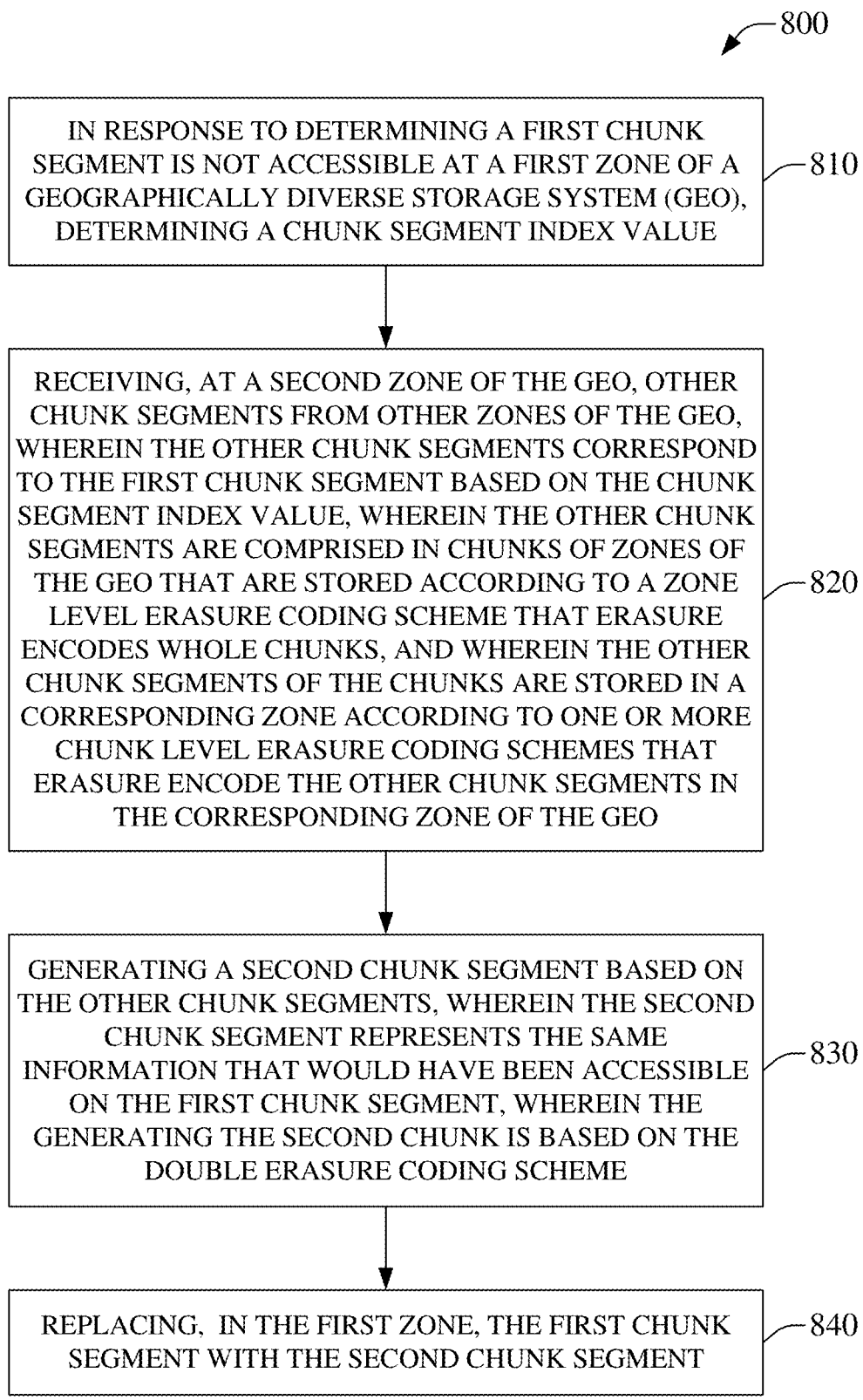
FIG. 8 illustrates an example method that enables chunk segment recovery based on data/code chunk segments stored via a combination of zone erasure coding and chunk erasure coding in a geographically diverse data storage system, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, facilitating chunk segment recovery based on hierarchical erasure coding of data stored in a geographically diverse data storage system, in accordance with aspects of the subject disclosure. At 710, method 700 can comprise determining a chunk segment index value. The determining the chunk segment index value can be in response to determining that a first chunk segment is not accessible at a first zone of a geo system. The index can be used to determine an offset and size of the segment in Zone A. In an aspect, offset=chunk_size/(k for the second-level erasure coding * the index of the segment), for example the fourth segment, e.g., index=3 where the index of a first segment is 0, of a 128 MB chunk protected by 12+4 erasure coding can have an offset of 128 MB/(12*3). In an aspect, the segment size=chunk_size/(k for the second-level erasure coding), for example the fourth segment, e.g., index=3 where the index of a first segment is 0, of a 128 MB chunk protected by 10+2 erasure coding can have an offset of 128 MB/10.

At 720, a second zone can receive other chunk segments corresponding to the first chunk segment based on the chunk segment index value. As an example, where the index at 710 is 3, e.g., the fourth segment, then the fourth segment of other chunks in other zones can be received at the second zone based on the index of 3, e.g., in the other zones, the local offset and segment size can be determined based on the index and the local second-level erasure coding scheme. The other chunk segments can be stored according to a double erasure coding that can be the same or different than the double erasure coding scheme of the first chunk of the first zone.

Method 700, at 730, can generate a second chunk segment based on the other chunk segments. At this point method 700 can end. In an aspect, the second chunk segment can represent the same information that would have been accessible on the first chunk segment. The second chunk segment can be generated according to the relevant double erasure coding schemes used to protect data in the zones of the GEO. As an example, see FIG. 6, wherein, for a loss of D4A of chunk A of Zone A, recovered D4A can be based on the 12+4 second-level and 4+2 first-level erasure coding of Chunk ADEF1 of Zone B, the 10+2 second-level and 4+2 first-level erasure coding of Chunk ADEF2 of Zone C, local second-level and 4+2 first-level erasure coding of Chunk D4C of Zone E, and the local second-level and 4+2 first-level erasure coding of Chunk D4B of Zone F.

FIG. 8 is an illustration of an example method 800, which can enable chunk segment recovery based on data/code chunk segments stored via a combination of zone erasure coding and chunk erasure coding in a geographically diverse data storage system, in accordance with aspects of the subject disclosure. At 810, method 800 can comprise determining a chunk segment index value. The determining the chunk segment index value can be in response to determining that a first chunk segment is not accessible at a first zone of a geo system. The index can be used to determine an offset and size of the segment in Zone A.

At 820, a second zone can receive other chunk segments corresponding to the first chunk segment based on the chunk segment index value. As an example, where the index at 810 is 3, e.g., the fourth segment, then the fourth segment of other chunks in other zones can be received at the second zone based on the index of 3, e.g., in the other zones, the local offset and segment size can be determined based on the index and the local second-level erasure coding scheme. The other chunk segments can be stored according to a first erasure coding that can a zone-level erasure coding scheme that erasure encodes whole chunks. The first erasure coding can be the same or different than the first erasure coding scheme of the first chunk of the first zone. The other chunk segments can be further be stored according to one or more second erasure coding that can be a chunk-level erasure coding schemes that erasure encode chunk segments. The second erasure coding schemes can be the same or different than a second erasure coding scheme of the first chunk of the first zone. As an example, see FIG. 6, wherein, chunk A of Zone A is protected by a 4+2 zone-level erasure coding and a 12+4 chunk-level erasure coding, Chunk ADEF1 of Zone B can be protected by a 4+2 zone-level erasure coding and a 12+4 chunk-level erasure coding, Chunk ADEF2 of Zone C can be protected by a 4+2 zone-level erasure coding and a 10+2 chunk-level erasure coding, etc.

Method 800, at 830, can generate a second chunk segment based on the other chunk segments. In an aspect, the second chunk segment can represent the same information that would have been accessible on the first chunk segment. The second chunk segment can be generated according to the relevant double erasure coding schemes used to protect data in the zones of the GEO. As an example, see FIG. 6, wherein, for a loss of D4A of chunk A of Zone A, recovered D4A can be based on the 12+4 second-level and 4+2 first-level erasure coding of Chunk ADEF1 of Zone B, the 10+2 second-level and 4+2 first-level erasure coding of Chunk ADEF2 of Zone C, local second-level and 4+2 first-level erasure coding of Chunk D4C of Zone E, and the local second-level and 4+2 first-level erasure coding of Chunk D4B of Zone F.

At 840, the first chunk segment of the first zone can be replaced with the second chunk segment. At this point method 800 can end. In an aspect, less accessible segments of a chunk can be replaced with recovered chunk segments, which can result in the chunk becoming accessible. In an aspect, where a chunk that is protected by a second-level erasure coding scheme has k segments of the k+m segments available, the data of the chunk can remain accessible without recovery of lost segments. However, where there are less than k segments of the k+m segments available, the data of the chunk become inaccessible without recovery of lost segments. In some embodiments, recovery of lost segments can occur upon detecting a lost segment even where the chunk itself remains accessible. In some embodiments, recovery of lost segments can occur upon detecting that the chunk is less accessible, e.g., because too many segments of the chunk have been lost. In an aspect, recovery of less than all lost segments can cause the chunk to become accessible. As an example, where the second-level erasure coding as 10+2 and the chunk loses three segments, the chunk can become inaccessible. In this example, recovery of lost segments can be triggered. In this example, recovery of only one segment can cause the chunk to become accessible again because the chunk would then only have two lost segments and, under the 10+2 coding, would be viable. In this example, the other lost segments can also be recovered.

Figure 9:
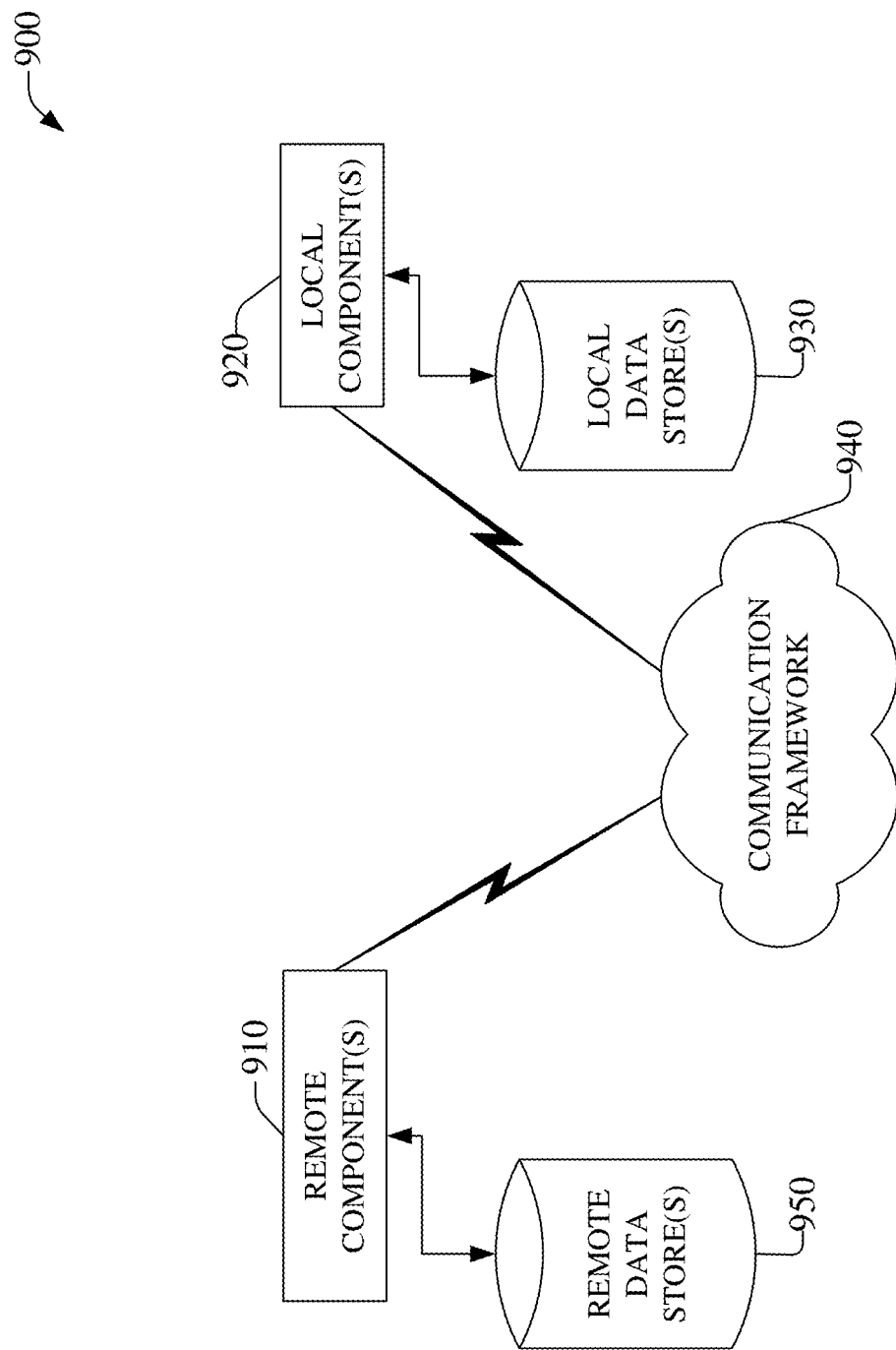
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework, e.g., communication framework 102, 202, 940, etc. Communication framework 940 can comprise wired network devices, wireless network devices, mobile devices, wearable devices, radio access network devices, gateway devices, femtocell devices, servers, etc. In an aspect the remotely located ZSC can be embodied in ZSC 110, 120, 130, Zones A-F of system 200, Zones A-F of system 300, Zones A-F of system 400, Zones A-F of system 600, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the local ZSC can be embodied in ZSC 110, 120, 130, Zones A-F of system 200, Zones A-F of system 300, Zones A-F of system 400, Zones A-F of system 600, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, information corresponding to chunks stored on ZSCs can be communicated via communication framework 940 to other ZSCs of a storage network, e.g., to facilitate recovering segments protected by a hierarchical erasure coding scheme, etc., as disclosed herein.

Figure 10:
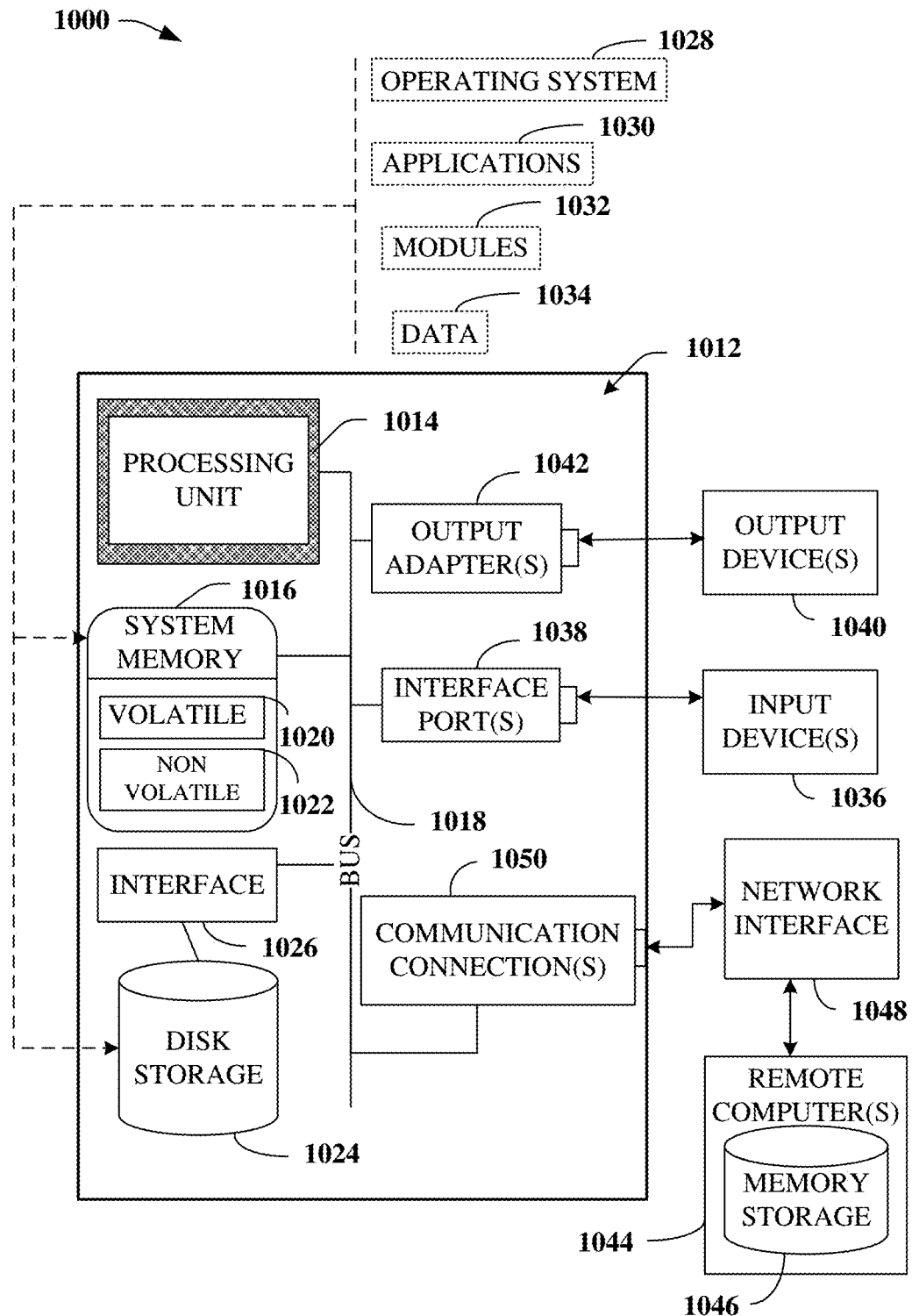
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC 110, 120, 130, Zones A-F of system 200, Zones A-F of system 300, Zones A-F of system 400, Zones A-F of system 600, etc., ECCC 108, 118,128,138, 618, etc., or in other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining an index of a first segment, determining a second segment of a second chunk of a second zone based on the index and the hierarchical erasure coding scheme, determining a second segment of the second relevant chunk, and replacing the first segment with a first recovered segment that is determined based, at least in part, on the second segment and the hierarchical erasure coding scheme, wherein the first recovered segment represents the same information as was represented on the first segment prior to the first segment becoming inaccessible.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        in response to determining that a first segment has become inaccessible, determining an index of the first segment, wherein the first segment is comprised in a first chunk of a first zone of zones of a geographically diverse data storage system, and wherein the zones of the geographically diverse data storage system employ hierarchical erasure coding;
        determining a second chunk of a second zone of the zones based on the hierarchical erasure coding, wherein the second chunk and the second zone are determined to be relevant to a recovery of the first segment;
        determining a second segment of the second relevant chunk based on the index and the hierarchical erasure coding, wherein the second segment is determined to be relevant to the recovery of the first segment;
        generating a first recovered segment based in at least in part on the second segment and the hierarchical erasure coding, wherein the first recovered segment represents the same information as was represented on the first segment prior to the first segment becoming inaccessible.

2. The system of claim 1, wherein the operations further comprise replacing the first segment with the first recovered segment in the first chunk of the first zone of the geographically diverse data storage system.

3. The system of claim 2, wherein the first segment is stored in part in a first physical memory cell of a first storage device of the first zone, wherein the replacing the first segment with the first recovered segment occurs at a second physical memory cell of a second storage device of the first zone, and wherein the first physical memory cell is a different physical memory cell than the second physical memory cell.

4. The system of claim 3, wherein the first storage device is a different storage device than the second storage device.

5. The system of claim 1, wherein the hierarchical erasure coding comprises a first-level erasure coding scheme and at least a first second-level erasure coding scheme.

6. The system of claim 5, wherein the first-level erasure coding scheme is a zone-level erasure coding scheme that protects at a whole chunk level across the zones of the geographically diverse data storage system.

7. The system of claim 6, wherein the zone-level erasure coding scheme is a '4+2' erasure coding scheme.

8. The system of claim 5, wherein the first second-level erasure coding scheme is a first chunk-level erasure coding scheme that protects at a chunk-segment level across the first chunk of the first zone of the geographically diverse data storage system.

9. The system of claim 8, wherein a second second-level erasure coding scheme is a second chunk-level erasure coding scheme that protects at a chunk-segment level across a second chunk of the first zone of the geographically diverse data storage system.

10. The system of claim 9, wherein the first chunk-level erasure coding scheme is a different chunk-level erasure coding scheme than the second chunk-level erasure coding scheme.

11. The system of claim 10, wherein the first chunk-level erasure coding scheme is a '12+4' chunk-level erasure coding scheme.

12. The system of claim 10, wherein the first chunk-level erasure coding scheme is a '10+2' chunk-level erasure coding scheme.

13. The system of claim 9, wherein the first chunk-level erasure coding scheme is a same chunk-level erasure coding scheme as the second chunk-level erasure coding scheme.

14. The system of claim 13, wherein the first chunk-level erasure coding scheme is selected from a group of chunk-level erasure coding schema comprising a '12+4' chunk-level erasure coding scheme and a '10+2' chunk-level erasure coding scheme.

15. A method, comprising:
  determining, by a system comprising a processor and a memory, an index of a first segment, wherein the first segment is comprised in a first chunk of a first zone of zones of a geographically diverse data storage system, and wherein the zones of the geographically diverse data storage system store data according to a hierarchical erasure coding scheme;
  determining, by the system, a second chunk of a second relevant zone of the zones based on the hierarchical erasure coding scheme, wherein the second chunk is determined to be a relevant chunk based on the hierarchical erasure coding scheme, and wherein the second zone is determined to be a relevant zone based on the hierarchical erasure coding scheme;
  determining, by the system, a second segment of the second relevant chunk, wherein the second segment is determined to be a relevant segment based on the index and the hierarchical erasure coding scheme;
  in response to receiving an indication that the first segment is inaccessible, replacing, by the system, the first segment with a first recovered segment that is determined based, at least in part, on the second segment and on the hierarchical erasure coding scheme, wherein the first recovered segment represents information that was represented on the first segment prior to the first segment becoming inaccessible.

16. The method of claim 15, wherein the hierarchical erasure coding comprises a zone-level erasure coding scheme and at least a first chunk-level erasure coding scheme.

17. The method of claim 16, wherein the zone-level erasure coding scheme is a '4+2' erasure coding scheme, and wherein the first chunk-level erasure coding scheme is selected from a group of chunk-level erasure coding schema comprising a '12+4' chunk-level erasure coding scheme and a '10+2' chunk-level erasure coding scheme.

18. A device, comprising:
  a processor; and
  a memory that stores executable instructions that, when executed by the processor, facilitate performance of operations, comprising:
    in response to receiving an indication that a first segment is inaccessible, determining an index of the first segment, wherein the first segment is comprised in a first chunk of a first zone of zones of a geographically diverse data storage system, and wherein the zones of the geographically diverse data storage system store data according to a hierarchical erasure coding scheme;
    determining a second segment of a second chunk of a second zone of the zones based on the index and on the hierarchical erasure coding scheme, wherein the second segment, the second chunk, and the second zone are used in connection with a recovery of the first segment;
    replacing, by the system, the first segment with a first recovered segment that is determined based, at least in part, on the second segment and on the hierarchical erasure coding scheme, wherein the first recovered segment represents information that was represented on the first segment prior to the first segment becoming inaccessible.

19. The device of claim 18, wherein the hierarchical erasure coding comprises a first-level erasure coding scheme and at least a first second-level erasure coding scheme.

20. The device of claim 19, wherein the first-level erasure coding scheme is a '4+2' erasure coding scheme, and wherein the first second-level erasure coding scheme is selected from a group of second-level erasure coding schema comprising at least a '12+4' chunk-level erasure coding scheme and a '10+2' chunk-level erasure coding scheme.

* * * * *